(12) United States Patent
Meyer-Gräfe et al.

(10) Patent No.: US 7,562,261 B2
(45) Date of Patent: Jul. 14, 2009

(54) SINGLE-SIGNAL TRANSMISSION OF SAFE PROCESS INFORMATION

(75) Inventors: Karsten Meyer-Gräfe, Hövelhof (DE); Oliver Stallmann, Bünde (DE); Johannes Kalhoff, Blomberg (DE); Steffen Horn, Schieder-Schwalenberg (DE); Torsten Gast, Aerzen (DE)

(73) Assignee: Phoenix Contact GmbH & Co., KG, Blomberg (DE)

( * ) Notice: Subject to any disclaimer, the term of this patent is extended or adjusted under 35 U.S.C. 154(b) by 459 days.

(21) Appl. No.: 10/758,857

(22) Filed: Jan. 16, 2004

(65) Prior Publication Data

US 2004/0199837 A1    Oct. 7, 2004

(30) Foreign Application Priority Data

Jan. 17, 2003    (DE)    ................ 103 01 504

(51) Int. Cl.
*G06F 11/00*    (2006.01)
(52) U.S. Cl. .......................... 714/48; 700/21
(58) Field of Classification Search ................ 714/797, 714/47, 48; 700/21
See application file for complete search history.

(56) References Cited

U.S. PATENT DOCUMENTS

| | | | | |
|---|---|---|---|---|
| 3,979,256 A * | 9/1976 | Keefe | .......................... | 376/215 |
| 4,631,722 A * | 12/1986 | Voss | .............................. | 714/24 |
| 4,652,776 A * | 3/1987 | George | ........................ | 307/407 |
| 4,794,601 A * | 12/1988 | Kikuchi | ...................... | 714/758 |
| 5,594,414 A * | 1/1997 | Namngani | .................. | 340/436 |
| 5,864,773 A * | 1/1999 | Barna et al. | ................... | 702/85 |
| 6,356,821 B1 * | 3/2002 | Yoshida | ........................ | 701/31 |
| 6,396,398 B1 * | 5/2002 | Donat et al. | ................ | 340/508 |
| 6,711,713 B1 * | 3/2004 | Rumpler et al. | ............. | 714/820 |
| 6,778,867 B1 * | 8/2004 | Ziegler et al. | ................. | 700/79 |
| 6,891,383 B2 * | 5/2005 | Nicholson et al. | ........... | 324/698 |
| 7,120,505 B2 * | 10/2006 | Nakamura et al. | ............. | 700/3 |
| 7,438,158 B2 * | 10/2008 | Heinzer et al. | ............. | 187/248 |
| 2003/0115543 A1 * | 6/2003 | Emde et al. | .................. | 714/800 |
| 2004/0215354 A1 * | 10/2004 | Nakamura et al. | ............ | 700/21 |

FOREIGN PATENT DOCUMENTS

| | | |
|---|---|---|
| DE | 199 20 299 | 11/2000 |
| GB | 2220280 | 7/1988 |
| JP | 58124801 | 7/1983 |
| JP | 6-012269 | 1/1994 |
| JP | 9-149007 | 6/1997 |

* cited by examiner

*Primary Examiner*—Scott T Baderman
*Assistant Examiner*—Paul F. Contino
(74) *Attorney, Agent, or Firm*—Ohlandt, Greeley, Ruggiero & Perle, L.L.P.

(57) ABSTRACT

A method and apparatus for the transmission of safe process information including detecting two or more process signals redundantly, identifying an event that is relevant to system safety, and converting said process signals to a single process signal for further system-based processing.

20 Claims, 1 Drawing Sheet

SINGLE-SIGNAL TRANSMISSION OF SAFE PROCESS INFORMATION

BACKGROUND OF THE INVENTION

1. Field of the Invention

The invention relates to a method and an apparatus for transmission of safe process signals between input and output units in a safety system.

2. Background of the Invention

Particularly in the case of systems which comprise standardized networks and have to satisfy stringent safety requirements, such as SIL 3 according to IEC Standard 61508 or, for example, Safety Category 4 in accordance with EN 954-1, the external circuitry of, for example, sensors and actuators must be designed on the basis of two channels, in order to ensure the necessary safety by means of the redundancy.

Such two-channel external circuitry is conventionally passed in the case of safety systems to similarly comparable, other redundant external circuitry, via separate signals from the sensors, which signals are normally transmitted via input/output units using a network or backplane bus of an integrated computer for control and/or logic processing. The control and/or logic processing then processes the two-channel signal circuitry by means of an appropriately matched emergency-off functional component, which must therefore furthermore be designed to have two channel inputs, and in consequence initiates a safe reaction. The safe reaction is often carried out directly at the controller, or is transmitted by means of a network and/or a backplane bus for the system-integrated computer to a corresponding output assembly, for example to an actuator.

SUMMARY OF THE INVENTION

The object of the invention is to indicate a way in which the transmission and, in consequence, the processing of safe process information are ensured in a considerably simplified manner, in particular in conjunction with an additional increase in the amount of data which can be transmitted and/or can be processed without any loss of information, and which in consequence allows better utilization of the system capacity.

In a very surprising manner, the solution according to the invention is achieved simply by a method having the features of claim 1, by an apparatus having the features of claim 11, and by a system having the features of claim 20.

The invention therefore provides that, for transmission of safe process information, two or more process signals, which are detected redundantly in order to identify an event which is relevant to system safety, are converted to a single process signal for system-based further processing.

The invention thus ensures that there is a substantially smaller amount of data to be transmitted and consequently to be further processed, for the same overall information content, particularly when using an apparatus for safe transmission of process signals. The process signals are detected redundantly for system safety. The apparatus has means for conversion of process signals to a single process signal. The process signals are carried on two or more channels. The single process signal can be tapped off from one output channel.

Furthermore, the invention makes it possible to achieve the reduction from a multichannel configuration of signal carrying paths, which would otherwise be required for safe transmission and system-based further processing of safety-relevant signals which are detected redundantly, to signal carrying paths in the form of single channels within the system. The hardware and/or software elements which are used for transmission and/or further processing of the safety-relevant process information in the system can thus be produced in a simplified and thus more cost-effective manner. Furthermore, the simplification obtained in this way, in particular as a result of the representation of the actual signal content that this makes possible, allows considerably simplified configuration and programming of safe systems.

In one advantageous development, the conversion is carried out to a digital signal, in particular in order to ensure further-simplified and faster, processor-based further processing of the process signal in order to initiate very highly time-critical reactions.

If, in one advantageous development, the conversion means comprises an A/D converter, this furthermore ensures the detection and/or transmission both of digital and/or analog process signals relating to externally connected device components so that, essentially, any commercially customary or available safety components such as an emergency-off component or a sensor for area monitoring for optical gratings, guard doors or scanners, can be connected to the system in order to supply safety-relevant process information.

A further preferred embodiment provides for the useful content of the converted process signal to be transmitted in the form of a 1-bit data item, which can be provided on an application-specific basis, for example just by using a single logic "AND" gate. A core safety system, once it has been configured and/or brought into operation, is in consequence independent of any replacement or of any changes to input and/or output components which can be connected and are relevant to system safety.

In order to further improve safety, the invention furthermore proposes that the transmission of the converted process signal be protected, in particular by means of a data protection value, The data protection value is based on the useful content. In a further advantageous embodiment, the means for protection of the converted signal is designed for generation and attachment of at least one check bit that follows the useful content.

In this case, the use of a so-called CRC (cyclic redundancy check) has been found to be particularly expedient in practice in order to further significantly improve the error identification rate.

The conversion means, which preferably comprises hardware and/or software elements, can advantageously be included at essentially any point, which is and/or can be predetermined as desired, in a process signal transmission path, so that, in particular, this ensures that the safety system can be extended even subsequently by means of additional safety-relevant components.

In consequence, the invention can essentially be used in any desired networks and allows safety-relevant components to be arranged distributed over the entire network, irrespective of system-based units such as system couplers and gateways, and is distinguished by a high level of simple integration, even using existing technologies.

One advantageous development additionally provides that the process signal which is converted to a single channel for safe system processing is converted once again to two or more process signals, which are carried via separate channels. System output assemblies are and/or can be predetermined, such as system-specific actuators, drives or mechatronics units.

BRIEF DESCRIPTION OF THE DRAWINGS

The invention will be described in more detail in the following text using a preferred embodiment and with reference to the attached drawing, in which.

DETAILED DESCRIPTION OF THE PREFERRED EMBODIMENTS

Figure 1:
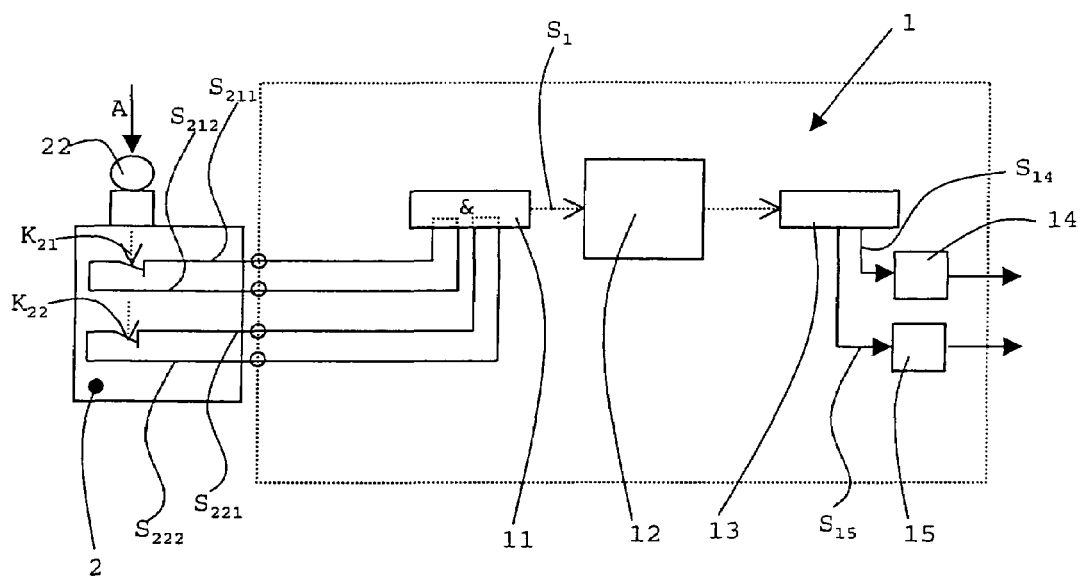
FIG. 1 shows a highly simplified block diagram of a safety system with an emergency-off safety input component connected to it.

A safety system which is identified overall by 1 is illustrated in a greatly simplified form with reference first of all to FIG. 1, with this safety system being used, for example, to control and/or regulate safety functions relating to personnel, machines and/or environmental protection in the manufacturing industry.

For this purpose, by way of example, an emergency-off functional component 2 is connected to a safe input component 11 of the safety system 1 in order to identify an "emergency-off" event which is relevant to system safety and which may, for example, be provided for a drive that is to be monitored. Particularly in the case of existing stringent safety requirements, as mentioned above, the circuitry of an emergency-off functional component 2 such as this must be designed redundantly, for example with two channels. In the present example, in the case of the illustrated emergency-off function that is not activated, two contacts $K_{21}$ and $K_{22}$ which are arranged in parallel are in the contact-making state, so that the partial signal paths $S_{211}$ and $S_{212}$ which are associated with the contact $K_{21}$ are conductively connected to one another via the closed contact $K_{21}$. In this case, a "one" signal, which is associated with the contact $K_{21}$, can be tapped off at the safe system input component 11. A "one" signal which is associated with the contact $K_{22}$ can be tapped off in a corresponding manner by means of the safe input component 11 at the partial signal paths $S_{221}$ and $S_{222}$ which are connected to one another.

When the emergency-off function is operated by pushing an emergency-off button 22 in the direction identified by A in FIG. 1, the contacts $K_{21}$ and $K_{22}$ are opened, so that, in consequence, a "ZERO" signal, which is associated with the contact $K_{21}$ can thus be tapped off at the input component 11 via the signal path $S_{211}$-$S_{212}$, which is thus interrupted, and a "ZERO" signal which is associated with the contact $K_{22}$ can be tapped off via the interrupted signal circuit $S_{221}$-$S_{222}$.

The two process signals which are detected redundantly for safety are now, according to the invention, reduced to a single process signal $S_1$ by means of the safe input component 11 of the safety system 1. The sole process signal $S_1$ is thus passed via a network (which is not illustrated in any more detail) and/or a backplane bus of a system computer and via a channel to the system-based further processing of a controller 12, with appropriately designed logic processing. If a safe reaction is to be initiated in response to the process signal $S_1$, this is carried out directly at the controller 12 or is transferred by means of the network and/or backplane bus further to a safe output component 13 which, via reaction signals $S_{14}$ and $S_{15}$, appropriately drives microcontrollers 14 and 15, respectively, in order to switch off associated area devices which are monitored by the safety system 1, that is to say in the present case drives to be monitored, for example motors or guard doors.

In particular, the conversion is preferably carried out to a digital signal $S_1$ in order to ensure processor-supported further processing, at least virtually online, of the process signal $S_1$.

In order to generate a 1-bit data item, the safe input component 11 in the example on which this is based preferably comprises a logic "AND" operation, which is formed by means of appropriate hardware and/or software elements, for the two signal channels $S_{211}$-$S_{212}$ and $S_{221}$-$S_{222}$.

In a corresponding manner, the converted process signal $S_1$ has the value "1" when both the switches $S_{21}$ and $S_{22}$ are closed, and two associated redundant process signals can thus be tapped off, each having a signal content which corresponds to the signal value of "1", via the safe input component 11. If the emergency-off function is activated and both signal paths $S_{211}$-$S_{212}$ and $S_{221}$-$S_{222}$ are thus interrupted, the converted process signal $S_1$ has the value "0". In a corresponding manner, the signal value of the process signal $S_1$ corresponds to the value "0" when one of the two switches $S_{21}$ and $S_{22}$ is opened, so that the signal value of the process signal $S_1$ is thus always "0" in a fault situation or safety situation.

The reduction of the redundantly detected process signals to the single process signal $S_1$ thus relates exclusively to the number of channels and not to the overall signal content. If, for example as shown in FIG. 1, monitoring for short-circuits is carried out, then in the case of the system-based further processing according to the invention with the single-channel system between the safe input component 11 and the output component 13 of the safety system 1, the overall signal content which signals a fault-free behavior is in consequence based on the signal values "both channels 1" which are valid in this case for $S_{211}$-$S_{212}$ and $S_{221}$-$S_{222}$.

In order to improve safety, the process signal $S_1$ is furthermore transmitted in a protected manner between the safe input component 11, which is illustrated in FIG. 1, and the safe output component 13.

In practice, at least one check bit or one check sum is attached to the useful content for this purpose, by means of the input component 11. The safe input component 11 preferably comprises a means, for example an appropriately adapted shift register, for carrying out a CRC method. The CRC code to be generated is generated at an appropriately high level depending on the application and/or requirements specific to the safety system and relating to the protection respectively required, for example using a CRC-32 code. However, it should be mentioned that suitable safety measures can also be carried out by other means which are known to the person skilled in the art, in order to satisfy the IEC International Standard 61508.

Figure 2:
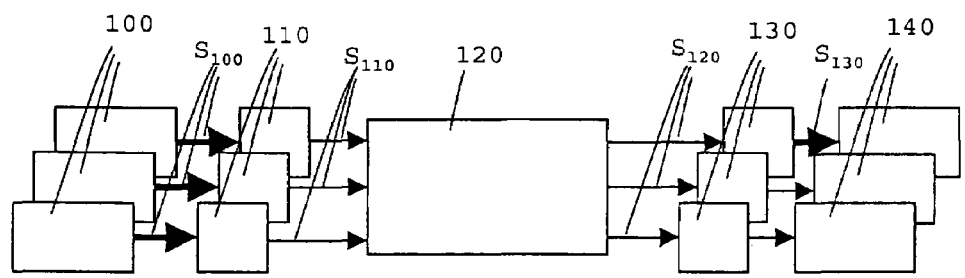
FIG. 2 shows an outline sketch relating to a signal chain for a safety function according to the invention.

With additional reference to FIG. 2, a signal chain according to the invention thus first of all comprises safe detection of input information based on functional components 100 such as sensors which can be connected and which initiate safety-relevant events. The events and process information which is or are in each case detected by means of redundant process signals $S_{100}$ is or are then in each case converted via safe input components 100 to a single process signal $S_{110}$ for further system-based processing. It should be mentioned that the process signals $S_{100}$ to be converted, that is to say those present at the input of the input components 110, are in digital and/or analog form, depending on the specific application or protection function component. In order to allow the input components 110 to convert analog process signals $S_{100}$ to a digital process signal $S_{101}$, the conversion device has an appropriate A/D converter component.

Furthermore, it should be mentioned that the conversion devices 110 may also be contained in intelligent network subscriber components or mechatronic units, depending on the system-specific embodiment, and need not necessarily be in the form of separate safe input components.

The process signals $S_{110}$, which are provided in their protected form downstream from the conversion devices 110, may in consequence be transported on a single channel through the entire system, that is to say in particular via at least one ring, star, line and/or tree network and/or bus network including transmission paths and structure/processing components.

Furthermore, the converted process signal is in consequence processed on a single channel in the system-based further-processing devices 120, such as controllers and/or logic devices and/or networks.

In order to initiate safe reactions in response to respective process signals $S_{110}$, corresponding reaction signals $S_{120}$, which are preferably also provided in the form of single signals and in a protected form, are passed to corresponding output components 130 which in the present case are designed for binary signal processing, in order to drive connected output functional components 140, such as actuators, in particular drives and/or mechatronic units, in accordance with the initiated reactions, for safe output and/or for safe disconnection.

As is indicated in FIG. 2, the invention furthermore covers embodiments in which the safe output components 130 are at least partially also designed such that a process signal $S_{120}$ which is supplied on a signal channel and has protected process information is once again converted to two more process signals $S_{130}$, which can also be transmitted via separate channels, in order to drive the output functional component 140.

The application according to the invention for simplified transmission of safe process information thus allows significant simplification of the configuration and programming of safe systems, in addition to significantly improving the capacity utilization since the amounts of data that have to be transmitted safely are less for the same information content. This is based in particular on the fact that the logic operations which otherwise have to be carried out in hardware on two or more channels are now, on the basis of the invention, carried out on a single-signal basis, representing the actual useful content, which very largely corresponds to the expectation of the engineer, programmer and/or service technician who, for example, identifies the "motor" output as a signal "motor on" or "motor off". A different approach is thus adopted upstream and downstream of the conversion point.

Since the conversion and reduction of two or more process signals, which describe an event which is relevant to system safety, to a single process signal can essentially be carried out at any desired point in the process signal transmission path, such as for example also in backplane systems, the invention comprises a large number of embodiments, in which the conversion devices are essentially distributed over the entire safety system and/or network, irrespective of any system couplers and gateways.

Overall, in the case of safety systems, the subject matter according to the invention can be used not only in the manufacturing industry, in particular for monitoring emergency-off functions, areas such as optical gratings, guard doors and/or scanners, and various applications, such as robots, area junctions including muting, blanking and/or pressing, and for safety control and/or regulation of actuators and sensor systems, in particular with integrated safety, but can also be used in particular in the field of passenger transport, for example for mountain railroads or lifts, in building engineering, for heating systems and for the process industry, to quote just a few application examples.

In consequence, single-channel safety-relevant process information which is protected, preferably exclusively, on the basis of the safety-relevant pre-processing functions carried out in the conversion devices 110, 130 according to the present description, is transmitted between the safe, system-specifically intelligent input and output components 110, 130 and the logic processing 120 which controls safety.

What is claimed is:

1. A method for transmission of safe process information, comprising:
   detecting a first process signal for identifying an event that is relevant to system safety;
   detecting at least one more process signal redundantly for identifying the same event; and
   converting said first and at least one more process signals to a single process signal for further system-based processing to carry out logic operations on a single-signal basis for identifying the same event,
   wherein the single process signal comprises process information that indicates a fault free behavior with regard to the same event only when each of said first and at least one more process signals indicate a fault free behavior with regard to said event.

2. The method as claimed in claim 1, wherein said redundantly detected process signals are detected in said conversion process via two or more channels, and wherein said single process signal is transmitted via one channel.

3. The method as claimed in claim 1, wherein said detection process is in digital or analog form.

4. The method as claimed in claim 1, wherein said conversion process is carried out to form a digital process signal.

5. The method as claimed in claim 1, further comprising transmitting a 1-bit data item as the useful content of said single process signal.

6. The method as claimed in claim 5, wherein said transmission of said single process signal is protected.

7. The method as claimed in claim 1, wherein said single process signal has useful content, and wherein at least one check bit is attached to said useful content in response to said conversion process.

8. The method as claimed in claim 7, further comprising using a CRC method to produce said at least one check bit.

9. The method as claimed in claim 1, wherein said conversion process is carried out at a point in a process signal transmission path capable of being predetermined.

10. The method as claimed in claim 2, wherein said single process signal is converted to two or more additional process signals that are carried via separate channels in a system output component that is capable of being predetermined.

11. An apparatus for safe transmission of process signals, comprising:
   a plurality of process signals being supplied on two or more channels and detected redundantly to identify the same event relevant to system safety; and
   a converter for conversion of said plurality of process signals to a single process signal, said single process signal being capable of being transmitted via one channel to carry out logic operations on a single-signal basis to identify the same event, wherein said converter converts the single process signal so as to include process information that indicates a fault free behavior with regard to the same event only when each of said plurality of process signals indicate a fault free behavior with regard to said event.

12. The apparatus as claimed in claim 11, further comprising means for system-based further processing of said single process signal.

13. The apparatus as claimed in claim 12, wherein said converter has associated with it an input component, an output component, an intelligent unit, and a mechatronic unit.

14. The apparatus as claimed in claim 11, wherein said converter is capable of producing a 1-bit data item.

15. The apparatus as claimed in claim 11, wherein said converter comprises a logic AND gate.

16. The apparatus as claimed in claim 11, wherein said converter has means for protection of said single process signal.

17. The apparatus as claimed in claim 16, wherein said converter has, for protection purposes, means for generation of at least one check bit and for attachment of said at least one check bit to a signal content of said single process signal.

18. The apparatus as claimed in claim 11, wherein said converter is designed for application of a CRC method.

19. The apparatus as claimed in claim 11, wherein said converter comprises hardware and/or software elements.

20. The apparatus as claimed in claim 11, further comprising at least one network for an automation system.

* * * * *